UNITED STATES PATENT OFFICE.

HERMANN VIETH, OF LUDWIGSHAFEN, GERMANY, ASSIGNOR TO KNOLL & COMPANY, OF SAME PLACE.

SALICYLGLYCOLIC ACID AND PROCESS OF MAKING SAME.

SPECIFICATION forming part of Letters Patent No. 672,156, dated April 16, 1901.

Application filed December 8, 1900. Serial No. 39,117. (Specimens.)

*To all whom it may concern:*

Be it known that I, HERMANN VIETH, a subject of the Duke of Anhalt, and a resident of Ludwigshafen-on-the-Rhine, Kingdom of Bavaria, German Empire, have invented a new and useful Improvement in Salicylglycolic Acid and Processes of Making the Same, of which the following is a specification.

The salicylglycolate of ethyl was obtained by Senff in the way of heating a mixture of salicylate of sodium and monochloracetic ether to about 130° centigrade. Senff, however, failed in his further trials of converting this ether into the free salicylglycolic acid by saponification. (See *Liebig's Annalen der Chemie* 208, page 276.) In studying this question I found that this way is still practicable provided the process of saponification is carried on at a moderate temperature. The higher the temperature the less salicylglycolic acid is formed, and at the boiling-point nearly the whole mass of the ether is decomposed into salicylic and glycolic acid.

Instead of the ethyl ether other ethers may be saponified.

Example 1: Ten parts of salicylglycolate of ethyl are dissolved in a mixture of sixteen parts of a twenty-five-per-cent. solution of caustic soda, (two molecules,) with the same weight of ice. The clear liquid containing now basic calicylglycolate of sodium is kept at a temperature of about 15° centigrade for about twenty minutes and then poured slowly into twenty parts of muriatic acid of twenty per cent., keeping the mixture cool and stirring thoroughly. The precipitate thus obtained is separated from the liquor, well washed with water, and dried. It forms a white crystalline mass of nearly pure salicylglycolic acid. The yield is almost equal to the theory.

Example 2: Ten parts of salicylglycolate of ethyl are dissolved in fifty parts of eighty-per-cent. sulfuric acid. This liquid is kept at a temperature of about 40° centigrade for about one hour. During this time the solution is converted into a mass of crystals. Ice and water being added, the crystals are separated and washed with water.

Example 3: Ten parts of salicylglycolate of ethyl are dissolved in sixteen parts of a twenty-five-per-cent. solution of caustic soda, exactly as in the first example. Then the solution is neutralized with an acid, (either muriatic acid or salicylglycolic acid.) Hereby the neutral salicylglycolate of sodium is formed. This salt may be obtained in a crystalline form either by adding common salt or alcohol to the liquor or by evaporating the solution in a vacuum-pan.

The salicylglycolic acid crystallizes, for instance, out of chloroform or benzol in well-formed crystals, showing, contrary to salicylic acid, a nearly parallel extinction of the polarized light—melting-point about 132° centigrade. Its solution is turned reddish violet by perchlorid of iron. The acid dissolves without decomposition in a solution of soda, but is decomposed by hot caustic alkalies or acids. It undergoes the same decomposition by the intestine liquid, but resists the gastric juice. Moreover, the salicylglycolic acid is characterized by forming acid alkali salts of a well-crystallized form. For instance, on pouring a small quantity of common-salt liquor to the mixture of the watery solutions of salicylglycolic acid (one molecule) and its neutral sodium salt (one molecule) the whole mixture changes into a mass of crystals, which being pressed off may be recrystallized from alcohol. Pure water, however, would decompose the salt—melting-point 203° centigrade—the neutral salt melting at 260° centigrade.

The salts of the earth alkalies are little soluble in cold water and crystallize. The salts of the metals—for instance, iron, silver, bismuth, and mercury—are nearly insoluble in water. The salicylglycolates have not the sweetish saline taste of the sodium salicylate, but taste rather bitter.

The acid and its salts are valuable remedies in polyarthritis and all diseases usually treated with salicylates. The dose is 0.5 gram per day.

What I claim as my invention is—

1. The process of manufacturing the salicylglycolic acid and its salts by saponifying its ethers at a temperature below 100° centigrade substantially as described.

2. As a new product the salicylglycolic acid herein described the crystals of which have a melting-point of about 132° centigrade, showing a nearly parallel extinction of the polarized light and in state of solution being turned into reddish violet by perchlorid of iron, dissolving without decomposition in a solution of soda and decomposing by hot caustic alkalies or acids.

In testimony that I claim the foregoing as my invention I have signed my name, in presence of two witnesses, this 23d day of November, A. D. 1900.

HERMANN VIETH.

Witnesses:
JACOB ADRIAN,
OSWALD KRUG.